United States Patent [19]

Breimesser

[11] 4,307,429

[45] Dec. 22, 1981

[54] METHOD AND APPARATUS FOR MONITORING CONDUCTOR CURRENTS FOR A FAULT CURRENT

[75] Inventor: Fritz Breimesser, Erlangen, Fed. Rep. of Germany

[73] Assignee: Siemens Aktiengesellschaft, Munich, Fed. Rep. of Germany

[21] Appl. No.: 119,834

[22] Filed: Feb. 8, 1980

[30] Foreign Application Priority Data

Feb. 23, 1979 [DE] Fed. Rep. of Germany ....... 2907171

[51] Int. Cl.³ .............................................. H02H 3/28
[52] U.S. Cl. ................................ 361/44; 324/117 R; 361/93
[58] Field of Search .................... 361/42, 44, 45, 46, 361/93; 324/117 R

[56] References Cited

U.S. PATENT DOCUMENTS 3,699,442 10/1972 Riley ................................ 324/117 R
4,135,222 1/1979 Siepmann ......................... 361/45 X

FOREIGN PATENT DOCUMENTS 2550060 3/1978 Fed. Rep. of Germany .
1359714 7/1974 United Kingdom .

Primary Examiner—Harry E. Moose, Jr.
Attorney, Agent, or Firm—Kenyon & Kenyon

[57] ABSTRACT

A method and apparatus for monitoring conductor currents for a fault current which changes the magnetic bias of a magnetic circuit in which the magnetization of the magnetic core is alternatingly reversed by sequences of magnetizing pulses and a determination made of the number of pulses up to which the pulse amplitude exceeds predetermined voltage reference value, with the change of this number of pulses used to derive an output signal.

15 Claims, 8 Drawing Figures

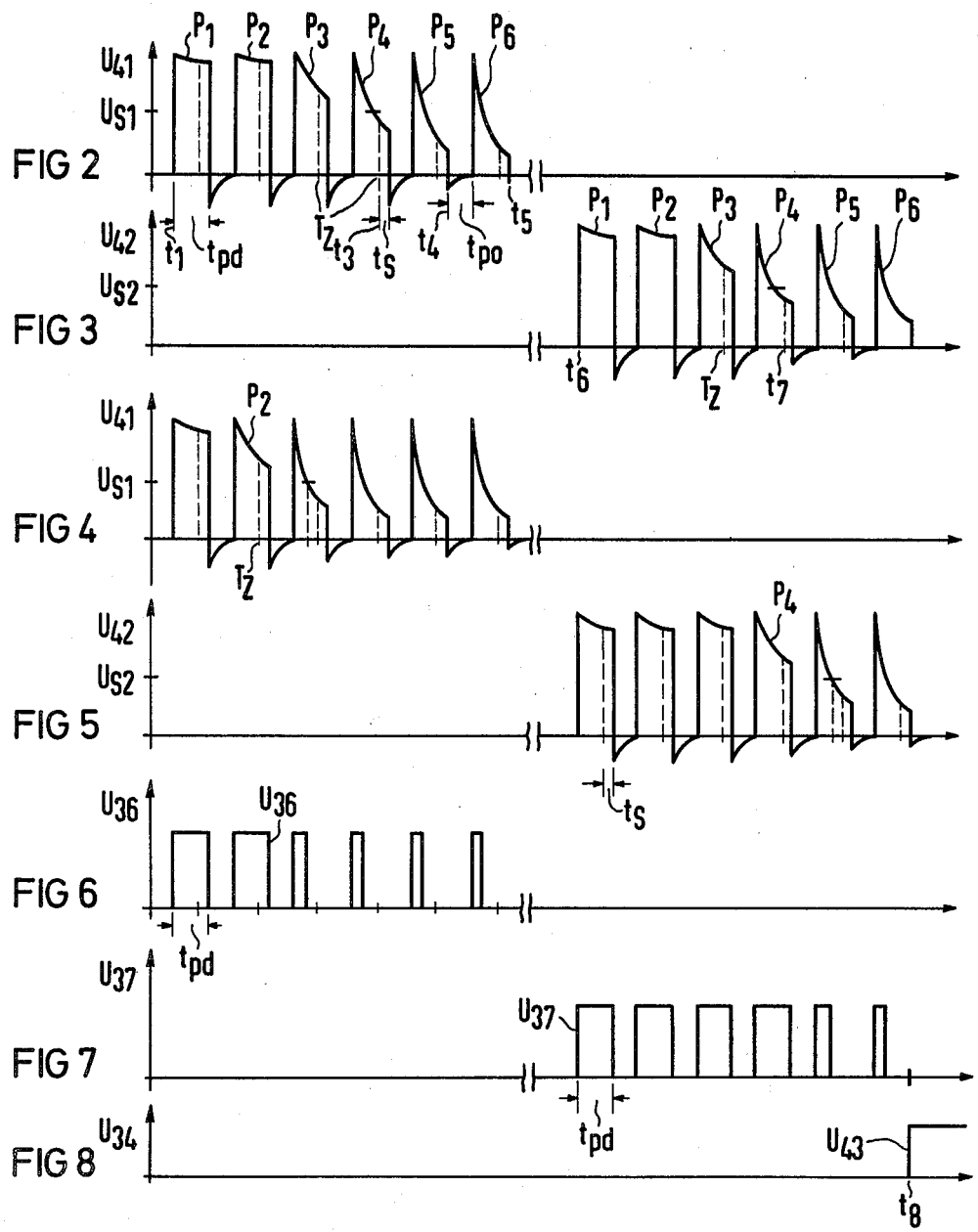

METHOD AND APPARATUS FOR MONITORING CONDUCTOR CURRENTS FOR A FAULT CURRENT

This invention relates to monitoring of conductors for fault currents in general and more particularly to an improved method for monitoring conductor currents for a fault current which changes the magnetic bias of a magnetic circuit, to the secondary winding of which a capacitor and a tripping device are connected.

Electrical installations, as is well known, are monitored by fault current protection circuits, in which the conductors of the circuit to be protected are brought through the toroidal core of a magnetic circuit and serve as the primary winding. The secondary winding is connected to the tripping device of a switch in the installation. Such fault current protection switches operate according to the principle of a differential transformer. In undisturbed operation, the sum of the primary currents is zero. In the event of an insulation defect, a leakage current flows to ground and back to the neutral point of the transformer resulting in an imbalance i.e., a difference, in the primary current. In case of periodic difference currents of sufficiently large amplitude in the primary circuit, enough energy is transmitted via the toroidal core of a high permeability alloy to the secondary circuit that a triping device which is arranged with a capacitor in the secondary circuit responds and in general acts on a circuit breaker of the circuit (British Pat. No. 1,359,714).

Because of the increasing frequency of non-linear consumers in power supply networks, d-c currents can also occur in the event of a disturbance. It is therefore an object of the invention to describe process steps for monitoring conductor currents for fault current, by means of which non-periodic difference currents, particularly d-c currents, can also be determined.

A method for measuring a magnetic field excitation linked to a magnetic circuit is known, in which, by means of a detection current excitation linked to the magnetic circuit, a change of the magnetic flux cylically varying in time and a measuring signal are determined by time intervals which depend on the magnetic bias and are derived from the respective state of saturation of the magnetic circuit. The difference is formed between the time intervals required to reach positive and negative saturation. In a device for carrying out this method, the tripping is accomplished exclusively by electronic circuitry. Trouble in the electronics therefore prevents the device from functioning. If this method is used for monitoring an installation with a a fault current protection switch, the secondary circuit is thus opened between the secondary winding and the holding magnet system (German Pat. No. 2 550 060).

SUMMARY OF THE INVENTION

According to the present invention, the stated problem is now solved with a magnetic circuit of the type mentioned at the outset by alternately reversing the magnetization of the magnetic core of the magnetic circuit in steps with sequences of magnetizing pulses and determining the number of pulses within the pulse sequence up to which the amplitude within the pulses exceeds a settable voltage reference value at a predetermined sampling instant, and deriving an output signal from a change of this number of pulses. An output signal can preferably be generated as soon as the number of pulses exceeds a predetermined value. It is also advantageous to integrate the change of the number of pulses over several pulse sequences. An output signal can then also be generated as soon as the difference of the number of pulses, up to which the pulse amplitude exceeds the reference voltage value, exceeds a predetermined settable value in two successive pulse sequences. Furthermore, the number of the magnetizing pulses of a pulse sequence is set automatically as a function of the number of pulses required for reversing the magnetization of the magnetic core.

One particularly advantageous embodiment of apparatus for implementing the method of the present invention includes an electronic circuit which is shunted across the secondary winding and the capacitor and which contains a pulse generator which supplies a sequence of magnetizing pulses, with a predetermined number and a direction which is reversed after each sequence, to the secondary winding; an evaluating device which always determines the number of pulses within the pulse sequences, up to which the pulse amplitude, at a predetermined sampling point within the pulse, exceeds a predetermined, settable voltage reference value and which derives, from the change of this number of pulses, an output signal; and a device for controlling the process, i.e., a device for controlling the other elements of the electronic circuit.

At least one digital reference value for a permissible change of the number of pulses is set into the evaluation device. The electronic circuit can advantageously also be provided with a device for the digital integration of the changes of the number of pulses over several pulse sequences. The input line of the evaluation device each contain a comparator for digitizing the voltage at the secondary winding. A logic element, the internal voltage threshold of which forms the voltage reference value may preferably be provided as the comparator.

The arrangement for implementing the method of the present invention forms a fault current protection switch which also operates independently of the electronic circuit; i.e., its monitoring function with respect to periodic difference currents remains intact even if the electronic circuit fails due to a defect. It is a particular advantage of the arrangement of the present invention that a micro-computer can be used as the electronic circuit, which maintains the entire cycle control. It generates the pulse sequences, each of which is fed to one of the respective lines of the secondary circuit. It also controls the setting of the number of pulses and the evaluation of the measurement signals. It checks the current-time characteristic of the measurement signals and carries out a self-test and forms a tripping signal for a main breaker of the installation as soon as the change of the number of pulses exceeds the set reference value. The reference value thus forms a dead zone for the fault current monitoring.

The magnetic excitation of the toroidal core by the individual pulses is advantageousl chosen to be substantially larger than the coercive force of the core material. The length of the individual pulses is preferably chosen substantially shorter than the switching time of the toroidal core.

All necessary digital signals in the required time relationship are generated under the cycle control. The pulses sequences can be applied, according to their current direction, to the measuring winding of the toroidal core by means of a push-pull circuit. A treshold switch delivers pulses to the evaluation device as long as the voltage pulses at the measuring winding are above the threshold value. Since the polarity of the output signals is not reversed even if the direction of the current changes, a threshold switch with one polarity is sufficient, for instance, a logic element, in the form of a gate with a fixed threshold, preferably an OR gate.

The push-pull circuit by which the toroidal core is addressed corresponds to the customary output circuits such as are used in TTL (transistor-transistor logic) technology. The pulse length and the length of the pulse sequence can advantageously be selected so that, without magnetic bias, the magnetization of the toroidal core must be reversed after approximately one-half of the pulse sequence. The pulse frequency is generally far higher than the line frequency and may be 1 to 50 Khz and preferably about 5 kHz. Stabilization of the frequency of the oscillator which furnishes the pulse sequence, is not necessary. The material for the toroidal cores may consist, for instance, of sintered ferrite (Siferrite). A toroidal tape core can also be used.

The evaluation of the counter reading i.e. the count of the number of pulses which exceed the predetermined threshold value, can be expanded in a simple manner, in a particular embodiment of an arrangement for implementing the method of the present invention, in such a manner that the waveform of the difference current is taken into account, for instance, via digital integration. The tripping characteristic can thereby be adapted to predetermined required waveforms.

BRIEF DESCRIPTION OF THE DRAWINGS

FIGS. 2 to 8 are diagrams illustrating the operation of the apparatus according to FIG. 1.

DETAILED DESCRIPTION OF THE INVENTION

Figure 1:
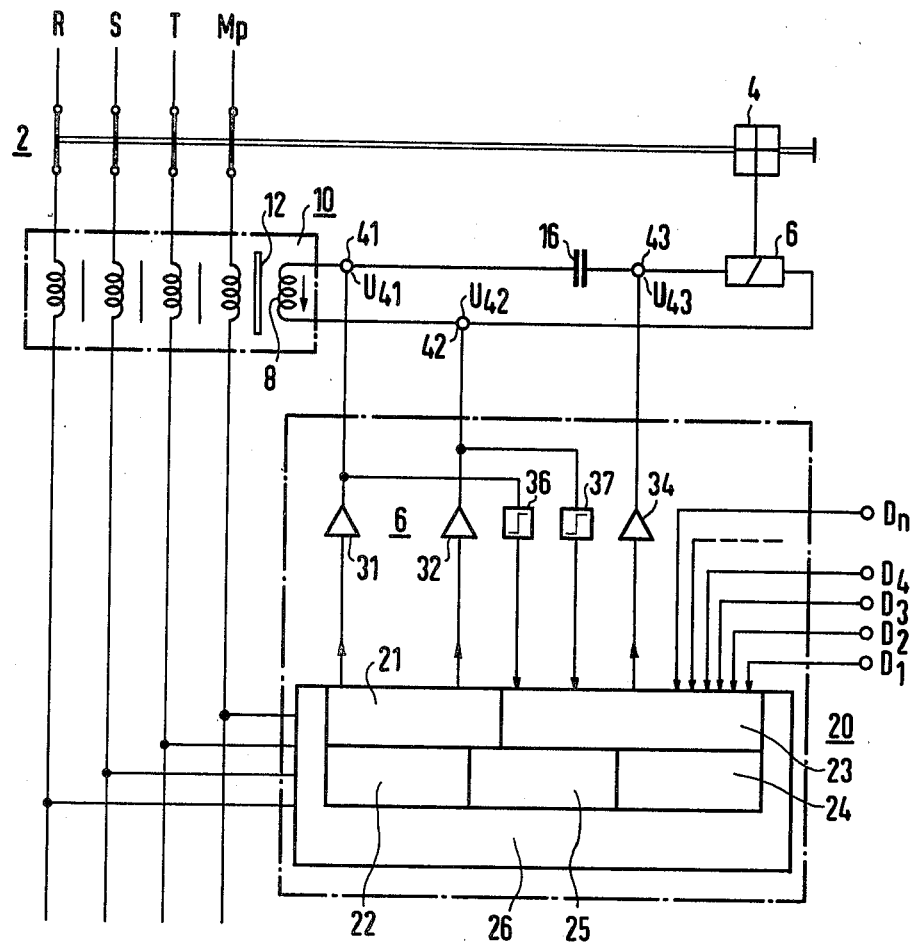
FIG. 1 is a schematic diagram of one embodiment of apparatus for implementing the method of the present invention.

According to FIG. 1, the three phase feed of an installation, the phases of which are designated as R, S and T and the neutral wire of which is designated as Mp, comprises a circuit breaker 2, having a switching mechanism 4. The breaker 2 has an associated tripping device 6 arranged in the secondary circuit of a magnetic circuit 10, the magnetic core 12 of which is merely indicated in the figure. A toroidal tape core with a flat hysteresis loop through which the three-phase conductors R, S and T are brought as the primary conductors can preferably be used as the magnetic core 12. The magnetic core 12 has a secondary winding 8, to the terminals 41 and 42 of which the tripping device 6 is connected in series with a capacitor 16, which together with the inductances of the tripping device 6 and the secondary winding 8 forms a resonant circuit.

An electronic circuit 20 is coupled to the terminals 41 and 42 and a terminal 43. Thus the electronic circuit 20 is shunted across the secondary winding 8 along with the capacitor 16 and the tripping device 6. The electronic circuit 20 contains a pulse generator 21, a setting device 22 for the number of pulses in a sequence, an evaluation device 23, a device for digital integration 24, a self-test unit 25 and a process control unit 26. It is preferably connected to the secondary winding 8 via two drivers 31 and 32. Two threshold switches 36 and 37 are connected into the input of the evaluation device 23. The evaluation devices delivers its output signal $U_{43}$ to the terminal 43, preferably likewise via a driver 34.

The electronic circuit 20 operates as a digital electronic circuit and is equipped with a power supply which is indicated in the figure merely as connecting wires to the three phase input line. During the measurement the driver 34 applies to the terminal 43 a potential which is apportioned so that no current which leads to triping can flow in the resonant circuit. To actuate the tripping device 6, the potential of the driver 34 is reversed.

According to FIGS. 2 and 3, the measurement signals transmitted by the drivers 31 or 32 consists of a sequence of preferably at least 100 pulses $U_{41}$ and $U_{42}$, respectively, of which only 6 are shown for the sake of simplicity and are designated as $P_1$ to $P_6$. Since each pulse of duration $t_{pd}$ furnishes only a small contribution to the reversal of the magnetization, the magnetization of the magnetic core 12 is reversed in steps. The length of the pulse intervals $t_{po}$ during the pulse sequence is chosen so that the resonant circuit consisting of the capacitor 16 and the inductance of the tripping device 6 is damped sufficiently during the measuring time. Each of the pulses $P_1$ to $P_6$ shifts the magnetization of the core 12 by a small amount on its characteristic, and, in the interval from $t_5$ to $t_6$ between the pulse sequences $U_{41}$ and $U_{42}$, the core 12 returns to the remanence point.

The pulse generator 21 contains a conventional push-pull output circuit. The drivers 31 and 32 in the output of pulse genrator 21 contain, in general, gates capable of supplying relatively large currents, i.e., gates with a large fan-out. The threshold switches 36 and 37 in the input lines of the evaluation device 23 act as a comparators and may be Schmitt triggers, for instance. The evaluation device 23 preferably contains, in addition, several inputs for setting in digital reference values $D_1$ to $D_n$, of which only the reference values $D_1$, $D_2$, $D_3$, $D_4$ and $D_n$ are shown in the figure for the sake of simplicity. These reference values form the respective tolerance limits for the evaluation device 23 and the self test unit 25 as well as for the device 24 for digital integration.

At the time $t_1$, the winding 8 receives, according to FIG. 2, via the driver 31, a pluse sequence $U_{41}$ of magnetizing pulses $P_1$ to $P_6$ of predetermined direction and at least approximately the same size, in particular the same amplitude. The waveshape of the magnetizing pulses of pulse sequences $U_{41}$ and $U_{42}$ serves as an indication of when the magnetization of the toroidal core 12 has been reversed. The pulses $P_1$ to $P_6$ flow through the winding in the direction indicated by the arrow in FIG. 1. The pulses $P_1$ to $P_6$ are coupled into the evaluation device 23 via the threshold switch 37. At a predetermined length of time $t_s$ prior to the end of each pulse, the amplitude of the pulse is evaluated and the number of pulses having a voltage which exceeds, at the sampling instant $T_z$, a settable threshold $U_{S1}$ is determined. In the example of FIG. 2, pulses $P_1$ to $P_3$ exceed this level. The fourth pulse $P_4$ drops, at the time $t_3$, below the threshold value $U_{S1}$ set at the threshold switch 37. At the time $t_4$ the magnetization of the magnetic core 12 is reversed completely and further pulses cause no additional magnetization. At the time $t_5$, the pulse sequence $U_{41}$ has ended.

At the time $t_6$, the winding 8 receives, according to FIG. 3, a new pulse sequence $U_{42}$ with pulses $P_1$ to $P_6$ of opposite direction. Corresponding to the pulse sequence $U_{41}$ the predetermined voltage reference value $U_{S2}$ is also exceeded with the pulses of sequence $U_{42}$ up to the pulse $P_3$ at the sampling point $T_z$. With the pulse $P_4$, the voltage reference value $U_{S2}$ is no longer reached at the time $t_7$. With pulse $P_5$, the magnetization of the magnetic core 12 is reversed.

In the event of a current change, for the instance, due to a fault current, a magnetic bias of the core occurs due to the fault current. Thereby, fewer pulses are required for the magnitization of the core 12 in one direction and correspondingly more pulses for the magnetization in the other direction. In the diagram according to FIG. 4, the set reference value $U_{S1}$ is therefore exceeded in the pulse sequence $U_{41}$ only up to the pulse $P_2$ at the sampling time $T_z$, while in the following pulse sequence $U_{42}$ of opposite direction, according to FIG. 5, the reference value $U_{S2}$ is still exceeded up to the pulse $P_4$.

The threshold values $U_{S1}$ and $U_{S2}$ according to FIGS. 2 to 5 are preferably of the same size and fixed into the corresponding threshold switches 36 and 37, respectively. As soon as these threshold values are no longer reached at the sampling instant, the threshold switch blocks its output and, according to FIG. 6, evaluation device 23 receives only two pulses, the widths of which corresponds to the width $t_{pd}$ of the magnetizing pulses $P_1$ and $P_2$ while correspondingly, four pulses with the width $t_{pd}$ are transmitted of the following pulse sequence $U_{37}$ by the threshold switch 37. In the evaluation device 23, a counter forms the difference between the number of wide pulses and narrow pulses which, according to FIGS. 2 and 3, is zero if there is no current deviation and the pulse groups $U_{41}$ and $U_{42}$ are therefore symmetrical. As soon as a current deviation and therefore, a magnetic bias of the core 12 occurs, the difference between the wide and narrow pulses $U_{36}$ and $U_{37}$ serves as a measure for the difference current, for instance, the fault current.

In the evaluation device 23, the difference between the number of wide and narrow pulses $U_{36}$ and $U_{37}$ is compared with a digital reference value $D_1$ and an output signal $U_{43}$ is generated if the difference between the wide and narrow pulses $U_{36}$ and $U_{37}$ exceeds the predetermined reference value $D_1$. By means of an interrogation pulse for the evaluation device, a check is then made at the end of each testing period as to whether the allowed difference of the counting pulses has been exceeded. If this is the case, the output signal $U_{43}$ is delivered at the time $t_8$, according to FIG. 8. It indicates a current deviation which has exceeded the set reference value D and can be used, for instance, as a signal for tripping the circuit breaker 2 for an installation.

In the presence of a large fault current with a corresponding change of the pulse duration $t_{pd}$ of the pulses $U_{36}$ and $U_{37}$, respectively, the output signal $U_{43}$ can be generated even after a few pulses or even immediately after the first pulse of pulse train $U_{41}$ or $U_{42}$, respectively.

The magnitude of the magnetization caused by the pulses of pulse sequences $U_{41}$ and $U_{42}$ is chosen so that the magnetic excitation of the core 12 of the measuring winding 8 is much larger than the coercive force of the material of the toroidal core 12. The pulse duration $t_{pd}$ of each of the individual pulses $U_{41}$ is chosen very much smaller than the switching time of the core 12. The pulse duration $t_{pd}$ can preferably be chosen so that the core 12 is switched after approximately one-half of the pulses $P_1$ to $P_6$.

The method of step-wise magnetization reversal reduces the time measurements to counting the pulses of pulse sequences $U_{41}$ and $U_{42}$, respectively. Each pulse sequence consists of $n_p$ pluses, for instance, in the illustrated example, $n_p=6$ pulses. The time until saturation is reached is represented by pulse numbers $n_{Ai}$, for instance, $n_{Ai}=3$ pulses according to FIGS. 2 and 3, respectively, wherein $n_{Ai} \leq n_p$. Here, $n_{Ai} \times t_{pd} = $ const for the case where there is no magnetic bias. The permissible limit of the time difference corresponds to the difference of the number of pulses.

With step-wise magnetization reversal, a measurement signal with a predetermined voltage-time characteristic is obtained, which changes with increasing saturation. Because of the internal impedance of the pulse generator 21, the magnetic core 12 is driven by a mixture of a constant voltage and constant current supply. After the peak at the start of each pulse, the signal drops more or less steeply, depending on the degree of magnetization reached. As soon as the core 12 has reached saturation, the measuring signal is deformed into a pulse sequence with peaks which are short in time. From the shape of the pulses, the transition to saturation can therefore be derived. Shortly before the end of each pulse, it is sampled at a predetermined sampling instant $T_z$ by the associated threshold switch 36 or 37, which acts as a comparator. If it is above the predetermined threshold value $U_{S1}$ or $U_{S2}$, the pulse counter is stepped up by 1. At the end of the $n_p$ magnetization reversal pulses, the counter then reads $n_{Ai}$.

The number of pulses is preferably evaluated in two steps twice per measuring peirod. Each pulse sequence $U_{41}$ and $U_{42}$, respectively, consists, in the practical embodiment, for instance, of $n_p=160$ pulses. Only 6 pulses in each sequence are shown in FIGS. 2 to 5 for the sake of simplification. Without fault current, for instance $n_{Ai}=3$ pulses are counted, according to FIGS. 2 and 3. This equals the predetermined value $n_{Ao}$, the number of pulses after which reversed will occur with not fault current. The evaluation device 23 is set to respond to a fault current corresponding to a deviation $D_1<(n_p-n_{Ao})$. First, a check is made to see whether the number of pulses is within the operating range. All numbers of pulses which do not fall in the interval $$(n_{Ao}-D_1)<n_{Ai}<(n_{Ao}+D_1)$$

are interpreted as the effect of excessive fault currents and therefore lead to a tripping of the breaker 2 even after one-half a measuring period.

In the second stage, a check can be made to see whether the amount of the difference between the number of wide pulses $U_{36}$ and $U_{37}$ for the two directions of magnetization of a measuring peirod fulfills the inequality $$|n_{A1}-n_{A2}|<D_2,$$

where $D_2$ represents a limit which is predetermined, according to the desired response value of the fault current, as a fraction of the nominal current, for instance, $0.7 \times I_N$. The response value is freely selectable within the range $D_2<2 \cdot D_1$.

Evaluating the difference doubles the response sensitivity because the deviations add up and, in addition, a shift of the number of pulses due to drift problems such as temperature sensitivity and aging of the components and which therefore changes both pulse sequences similarly, is compensated.

For example consider $D_1=1$ and $D_2=1$. In FIGS. 4 and 5 $n_{Ai}=4$ and 2 respectively, $n_{Ao}=3$. Thus in the first stage there would be no response. But in the second stage $n_{A1}-n_{A2}=2-4=2$ and the evaluation circuit will respond. Of course with the larger number of pulses used in practice, a much finer resolution is possible.

The evaluation device 23 responds to large fault currents after one-half the measuring period (as established by $D_1$) and to the predetermined reference fault current after a full measuring period (as established by $D_2$); the fault current can have any waveshape. In addition, using a digital technique makes it possible, without additional hardware, to include an integration circuit 24 into the evaluation device, whereby even smaller fault currents which, however, flow over a longer time period, can be detected. The measured differences are integrated over several measuring periods. The tripping criterion is then formed by the content on an integrator which adds up the differences which exceed a predetermined thereshold $D_3<D_2$.

If the evaluation device 23 has detected an excessively large fault current, the potential $U_{43}$ of the holding line is switched, according to FIG. 8, via the tripping deice 34 as per FIG. 1. Thus, a current flows through the tripping device 6 which acts as a holding magnet and weakends the magnetic circuit so that the armature of the switching device 4 drops off and the breaker is tripped mechanically.

The connection of the electronic circuit 20 to the secondary circuit of the magnet 12 is monitored automatically. If the secondary circuit is interrupted, the tripping device 6 will trip already during one measuring period. Line interruptions to the secondary circuit are detected at the end of a measuring period, since then the measured number of pulses $U_{36}$ or $U_{37}$ is equal to the total number of pulses in the pulse sequences $U_{41}$ or $U_{42}$, respectively and the evaluation device 23 interprets this as a large fault current. To effect tripping, two of the three feed lines between the electronic circuit 20 and the fault current protection circuit breaker must be undisturbed. The "2-out-of-3" concept customary in safety engineering is therefore observed without additional cost.

The operation of the electronics is monitored by the self-test device 25. The latter changes the pulse duration $t_{pd}$ of the magnetization reversal pulses $U_{41}$ and $U_{42}$ and it is checked whether the measured number of pulses changes accordingly. For instance, if the pulse duration is doubled, the measured number of pulses must be reduced to one-half. The dynamic equilibrium is preserved.

After the first half of the testing period, and interrogation is then made as to whether the measured number of pulses $n_{11}$ is at least approximately one-half of the original number of pulses $n_{Ao}$. If the reference value $D_4$ is taken as the tolerance limit, the inequality $$|n_{11}/n_{Ao}-\tfrac{1}{2}|<D_4$$

must be fulfilled if the operation is correct.

After the second half of the testing period, the corresponding inequality is checked for the second pulse sequence.

The time relations and therefore, the operating point of the magnetic core 12 are kept constant.

The d-c sensitive arrangement is tested with a d-c fault current. When a test button is depressed, the electronic circuit 20 must respond and trip the breaker 2. This checks the operation of the electronic circuitry 20 as well as the mechanism of the holding magnet system.

If the supply network (not specially designated) or the power supply of the electronic circuit 20 fails the arrangement responds in the known manner to a-c fault currents as well as full and partially gated half-wave currents. When the voltage returns, the electronic circuit 20 again takes over the monitoring for fault currents.

In a preparatory phase, the magnetization of the toroidal core is reversed once by supplying a number of pulses $n_{max}$ in each direction. The number of pulses $n_{max}$ can preferably be about 20% larger than the values of $n_p$ previously determined by experience. Then the number of pulses $n_{Ai}$ necessary for reversal is determined. The number of pulses for one pulse sequence can now be fixed within $n_p>(n_{Ai}+D_1)$. After the following measuring period, the first difference is evaluated. From this point in time on, the electronic circuit 20 is effective.

Except for the comparators 36 and 37 for digitizing the measurement signals, only digital components are used in the arrangement. In the block diagram according to FIG. 1, the drivers 31 and 32 as well as 34 and the two comparators 36 and 37 connect the pulse sensitive fault interrup switch to the digital electronic circuit 20. The functions of electronic circuit 20 contained in the block diagram can be realized with a microcomputer.

The microcomputer serving as the electronic circuit 20 executes the program items set into it sequentially. After the start, a setting phase is transversed, in which the number of pulses required for reversal are determined. This is followed by a self-test and a loop with, for instance, 25 measuring periods. Then the program jumps back to self-test. This process is repeated cylically until an excessively high fault current because one of the set reference values $D_1$, $D_2$ or $D_3$ is exceeded or a functional defect with respect to the corresponding reference values $D_1$ and $D_4$ is detected. In these cases, the switch 2 is tripped via the driver 34.

A single-chip microprocesor is sufficient for the apparatus. The entire program including a table for the current-time characteristic of the digital integrating device 24 requires a memory of only 1000 words (1-kilobyte PROM). The area required for the entire electronic circuitry 20 is smaller than the base area of the fault current protection switch mentioned at the outset.

The pulse duration $t_{pd}$ can be set by a program and is chosen as small as possible so as to achieve high sensitivity. If, for instance, a pulse duration of $t_{pd}=16$ is set and the limit of the operating range is fixed at $D_1=16$, then a number of pulses $n_p=160$ pulses is obtained. The pulse length $t_{po}$ can be, for instance, 22 us. With these values, a sensitivity of about 0.5 pulses/mA is determined. The sensitivity differs only little betwee d-c and a-c. With a given pulse difference in the range about 20 mA of fault current the ratio of d-c to a-c is $>0.8:1$.

In the method for the step-wise reversal of magnetization, the sensitivities for d-c and a-c are in a fixed ratio to each other, which depends on the duration of the pulse sequence and the period of a fullwave fault current.

The ratio of d-c to a-c sensitivity can be set, for instance, by the choice of the driver voltage. For very short pulse sequences, it goes toward the limit $\sqrt{2}$, corresponding to the ratio of peak to RMS value of the full wave fault current.

What is claimed is:

1. A method for monitoring conductor currents for a fault current which changes the magnetic bias of a magnetic circuit, having a secondary winding to which a capacitor and a tripping device are connected, comprising:
- (a) alternately reversing the magnetization of the magnetic core of the magnetic circuit in steps with sequences of magnetizing pulses;
- (b) determining the number of pulses within the pulse sequences up to which the pulse amplitude exceeds a preset voltage reference value at a predetermined sampling point within the pulses; and
- (c) deriving an output signal in response to a change in the number of pulses exceeding said preset reference valve.

2. The method according to claim 1, comprising generating an output signal as soon as the change of said number of pulses exceeds a first predetermined reference value.

3. The method according to claim 1, and further including performing a digital integration of the changes of the number of pulses over several pulse sequences.

4. The method according to claim 1 or 2, and further including generating an output signal an soon as the difference of the numbers of pulses, in two successive pulse sequences, up to which the pulse amplitude exceeds said voltage reference value, exceeds a second predetermined reference value.

5. The method according to claim 1, and further including automatically setting the number of pulses in each pulse sequence in dependence on the number of pulses required for reversing the magnetization of the magnetic core.

6. The method according to claim 1 and further including self-testing the apparatus performing said method by changing the pulse duration and determining the number of pulses resulting therefrom, and comparing said number with a fourth predetermined reference value.

7. In apparatus for monitoring conductor currents for a fault current which changes the magnetic bias of a magnetic circuit, having a secondary winding to which a capacitor and a tripping device are connected, by an electronic circuit shunted across the secondary winding and the capacitor, said electronic circuit including:
- (a) a pulse generator coupled to deliver to the secondary winding sequences of magnetizing pulses of predetermined number and with a direction which changes after each sequence;
- (b) an evaluation device coupled to detect the respective number of pulses within the pulse sequences up to which the pulse amplitude exceeds a predetermined voltage reference value at a predetermined sampling point within the pulse;
- (c) mean to derive an output signal from the change of said number of pulses; and
- (d) means for controlling said pulse generator, evaluation device and means to derive.

8. Apparatus according to claim 7, and further including means to preset at least one digital reference value representing a permissible change of the number of pulses into said evaulation device.

9. Apparatus according to claim 7, wherein said electronic circuit further includes means for digitally integrating the changes of the numbers of pulses over several pulse sequences.

10. Apparatus according to claim 7 wherein said electronic circuit further includes means for automatically setting the number of pulses in said sequences.

11. Apparatus according to claim 7 wherein said electronic circuit further includes a self-test device.

12. Apparatus according to claim 7 and further including means for digitizing the voltage at the secondary winding interposed between said secondary winding and said evaluation circuit.

13. Apparatus according to claim 12, wherein said means for digitizing comprises a logic component, having an internal voltage threshold which forms said voltage reference value.

14. Apparatus according to claim 7 wherein said the pulse generator is connected to the secondary winding via a push pull circuit with digital driver stages.

15. Apparatus according to claim 7, wherein said electronic circuit comprises a microcomputer.

* * * * *